United States Patent [19]
Brodzinski et al.

[11] Patent Number: 4,617,169
[45] Date of Patent: Oct. 14, 1986

[54] MEASUREMENT OF RADIONUCLIDES IN WASTE PACKAGES

[75] Inventors: Ronald L. Brodzinski; Richard W. Perkins; Henry G. Rieck; Ned A. Wogman, all of Richland, Wash.

[73] Assignee: The United States of America as represented by the United States Department of Energy, Washington, D.C.

[21] Appl. No.: 649,625

[22] Filed: Sep. 12, 1984

[51] Int. Cl.$^4$ .............................................. G21C 17/00
[52] U.S. Cl. ..................................... 376/257; 376/157
[58] Field of Search ............................. 376/257, 157; 250/390–392

[56] References Cited

U.S. PATENT DOCUMENTS 4,335,466  6/1982  Lee ........................................ 376/257
4,497,768  2/1985  Caldwell et al. ..................... 376/257
4,510,117  4/1985  Phillips et al. ....................... 376/257

FOREIGN PATENT DOCUMENTS 53-24990  3/1978  Japan .................................... 376/257
53-22993  3/1978  Japan .................................... 376/257

OTHER PUBLICATIONS

Nuc. Tech., vol. 29 (5/76), pp. 239–248, Tasaka, "Estimation of Irradiation History of Spent Fuel . . . ".
LA-4315-MS (3/70), Keepin, ed., pp. 4–27, "Nuclear Safeguards Research & Development".
Nucl. Inst. & Meth., vol. 220, Nos. 2, 3, Mar. 1, 1984, Close et al., pp. 531–536.

Primary Examiner—Salvatore Cangialosi
Attorney, Agent, or Firm—Robert Southworth; Judson R. Hightower

[57] ABSTRACT

A method is described for non-destructively assaying the radionuclide content of solid waste in a sealed container by analysis of the waste's gamma-ray spectrum and neutron emissions. Some radionuclides are measured by characteristic photopeaks in the gamma-ray spectrum; transuranic nuclides are measured by neutron emission rate; other radionuclides are measured by correlation with those already measured.

1 Claim, No Drawings

MEASUREMENT OF RADIONUCLIDES IN WASTE PACKAGES

The U.S. Government has rights in this invention pursuant to Contract No. DE-AC06-76RL0-1830.

BACKGROUND OF THE INVENTION

The invention relates generally to the non-destructive assay of radionuclides, and, more particularly to a method for assaying the radionuclide content of waste by measuring emitted gamma and neutron radiation.

Operation of nuclear power plants results in the generation of low level waste. Before this waste may be disposed of by land burial, it is necessary to verify its contents. The rule 10 CFR 61 provides specifications as to the quantities of transuranic radionuclides and certain other radionuclides that are permitted in waste packages slated for disposal at commercial shallow land fill burial sites. However, many of these radionuclides are difficult or impossible to measure by direct counting techniques. Nuclear utilities have been unable to economically comply with the 10 CFR 61 rule. We have discovered a method to assay these radionuclides by correlation with those radionuclides which can be measured. It is now possible to assay a sealed waste package for all of the radionuclides specified in 10 CFR 61.

It is accordingly, an object of the invention to provide a method for non-destructively assaying radionuclides in a sealed container.

It is a further object of the invention to provide a method for assaying radionuclides which cannot be assayed by direct counting techniques.

Other objects, advantages, and novel features of the invention will be apparent to those of ordinary skill in the art upon examination of the following detailed description of a preferred embodiment of the invention.

SUMMARY OF THE INVENTION

A method is provided for non-destructively assaying the radionuclide content of solid waste in a sealed container. First, the waste's gamma-ray spectrum and neutron emissions are measured. Then, some radionuclides are determined by characteristic photopeaks in the gamma-ray spectrum; transuranic nuclides are determined by the neutron emission rate; others are determined by their correlation with those already measured.

DESCRIPTION OF A PREFERRED EMBODIMENT

In a preferred embodiment, nuclear waste, which has previously been sealed in an appropriate container such as a 55 gallon drum, is placed in an apparatus for detecting emitted radiation. Such apparatus, which is well known in the industry, may comprise an annular bank of $^{10}BF_3$ tubes with appropriate moderating materials to allow the thermalization and capture of spontaneous fission and (alpha, n) neutrons emitted or generated by transuranic elements in the waste. Each neutron captured by a $^{10}BF_3$ tube results in an electrical impulse which may be counted. Coincidence circuitry allow the counting of the number of neutrons which are generated in a single spontaneous fission event.

The apparatus further comprises a large high resolution gamma-ray detector, which for example, may be an intrinsic germanium diode that traverses the length of the barrel as the barrel is rotated around its axis.

One begins the assay of radionuclides in waste by determining the type of reactor responsibile for the generation of the waste, the degree of fuel enrichment of the reactor's core, and the decay time since the waste was removed from the influence of the operating reactor core. These parameters affect the neutron spectrum experienced, the amount of radioactive decay, in the reactor and thus the precise distribution of transuranics, fission products, and activation products remaining in the waste.

After the gamma-ray spectrum has been measured, data-reduction begins by determining the matrix density of the waste. The waste may, for example be packaged in a matrix of polyvinyl ester or in portland cement or may comprise massive pieces of metal. Each matrix will attenuate radiation in a different way and must be characterized before the gamma-ray spectrum is interpreted. The matrix density may be determined by examining two photopeaks of significantly different energy in the gamma-ray spectrum that are due to the presence of a single radioisotope. The ratio between these two peaks will give an indication of the relative attenuation of these two different energies of gamma-rays. This ratio will vary with differing matrix density.

Examples of photopeak pairs which may be used are $^{60}Co$(1173 and 1332 kev) $^{106}Ru$(622 and 1050 kev), $^{125}Sb$(176, 428, and 636 kev) $^{134}Cs$(569, 796, and 1365 kev), $^{144}Ce$(134 and 697 kev), and $^{154}Eu$(723 and 1274 kev).

Knowing the matrix density, the gamma-ray spectrum may then be analysed for the intensity of individual photopeaks which are specific to individual isotopes. Isotopes which may be so assayed include the above $^{54}Mn$(835 kev), $^{57}Co$(122 kev), $^{58}Co$(811 kev), $^{95}Zr$(724, 757, and 766 kev), $^{110m}Ag$(885 kev), $^{137}Cs$(662 kev), $^{140}Ba$(1596 kev), and $^{152}Eu$(1408 kev).

$^{90}Sr$ and its equilibrium daughter $^{90}Y$ do not yield an identifiable photopeak in the gamma-ray spectrum, but their bremsstrahlung radiation does make a contribution to the gamma-ray spectrum. If the gamma-ray contribution of the isotopes which have previously been determined are subtracted from the gamma-ray spectrum, the difference may be attributed to $^{90}Sr$ and $^{90}Y$.

$^{129}I$ and $^{99}Tc$ isotopes are not amenable to determination by direct nondestructive counting. However, these isotopes may be correlated with $^{137}Cs$, $^{106}Ru$, and $^{144}Ce$. Since these latter isotopes have previously been determined, the former isotopes may be determined indirectly.

$^{3}H$, $^{14}C$, $^{59}Ni$, $^{63}Ni$, and $^{94}Nb$ isotopes are also not amenable to determination by direct counting. However, these isotopes may be correlated with $^{60}Co$ and $^{54}Mn$. Since these latter isotopes have previously been determined, the former isotopes may be determined indirectly.

A parameter known as burnup is a measure of the fraction of fissionable isotopes originally present in nuclear fuel that have undergone fission. For a given type of nuclear reactor and a given percent enrichment, both of which are known from administrative records, the burnup is a function of the ratio between $^{137}Cs$ and $^{134}Cs$ contents. Since these contents have been previously been determined, the percent burnup parameter may be determined. This parameter is important in the determination of the transuranic isotopes as detailed below.

The transuranic radionuclides such as $^{238}Pu$, $^{239}Pu$, $^{240}Pu$, $^{242}Pu$, $^{241}Am$, $^{242}Cm$, and $^{244}Cm$, be determined from neutron emissions. Each of these isotopes either spontaneoulsy fissions releasing a number of neutrons or it undergoes alpha decay. The resultant alpha particle may interact with light nucleii in the matrix to yield a single neutron via the (alpha, n) reaction.

Because of their shorter half-life, the majority of the neutrons emitted from waste will be emitted by the isotopes $^{242}$Cm and $^{244}$Cm. The ratio of the other transuranic radionuclides to these curium isotopes is predictable for given exposure periods (burnup) and decay times. Therefore, a good estimation of the individual concentrations of all transuranic radionuclides may be obtained.

A further refinement of this estimate may be obtained by an analysis of neutron multiplicity. Each spontaneously fissionable nucleus will, on the average, emit a characteristic number of neutrons. For example $^{240}$Pu, on the average, will yield 2.257 neutrons while $^{244}$Cm on the average will yield 2.738 neutrons. Therefore, a given distribution of spontaneously fissioning isotopes will yield a characteristic number of neutrons per fission event, or neutron mulitplicity.

The foregoing description of preferred embodiment of the invention has been presented for purposes of illustration and description and is not intended to be exhanstive or to limit the invention to the precise form disclosed. It was chosen and described in order to best explain the principles of the invention and their practical application to thereby enable others skilled in the art to best utilize the inventions in various embodiments and with various modifications as are suited to the particular use contemplated. It is intended that the scope of the invention be defined by the claims appended hereto.

We claim:

1. A method for non-destructively assaying the radionuclide content of solid waste in a sealed container comprising:

(a) determining the type of reactor responsible for the generation of said waste;
(b) determining the degree of fuel enrichment of said reactor;
(c) determining the decay time of said waste since exposure in said reactor;
(d) measuring the gamma-ray spectrum of said waste;
(e) determining the matrix density of said waste from ratios of photopeak pairs from individual radioisotopes in said gamma-ray spectrum;
(f) determining the $^{54}$Mn, $^{57}$Co, $^{58}$Co, $^{60}$Co, $^{95}$Zr, $^{106}$Ru, $^{110m}$Ag, $^{125}$Sb, $^{134}$Cs, $^{137}$Cs, $^{140}$Ba, $^{144}$Ce, $^{152}$Eu, and $^{154}$Eu content in said waste from the intensities of photopeaks in the gamma-ray spectrum characteristic of each isotope and from said matrix density;
(g) determining the $^{90}$Sr and $^{90}$Y contents of said waste by subtracting the gamma-ray contribution of those isotopes determined in step (f) from said gamma-ray spectrum and attributing the difference to $^{90}$Sr and $^{90}$Y bremsstrahlung radiation;
(h) determining the $^{129}$I and $^{99}$Tc contents of said waste from said $^{137}$Cs, $^{106}$Ru, and $^{144}$Ce contents;
(i) determining the $^{3}$H, $^{14}$C, $^{59}$Ni, $^{63}$Ni, and $^{94}$Nb contents of said waste from said $^{60}$Co and $^{54}$Mn contents of said waste;
(j) determining burnup from the ratio between said $^{137}$Cs content and said $^{134}$Cs content and from said reactor type and said fuel enrichment and said decay time;
(k) measuring the total neutron flux and the coincidence neutron flux of said waste;
(l) determining neutron multiplicity from said coincidence neutron flux; and
(m) determining the $^{238}$Pu, $^{239}$Pu, $^{240}$Pu, $^{242}$Pu, $^{241}$Am, $^{243}$Am, $^{242}$Cm, and $^{244}$Cm contents of said waste from said neutron flux, said neutron multiplicity, and said percent burnup.

* * * * *